US009712845B2

(12) United States Patent
Ebrahimi et al.

(10) Patent No.: US 9,712,845 B2
(45) Date of Patent: Jul. 18, 2017

(54) MEDIA CONTENT PROCESSING METHOD

(71) Applicant: ECOLE POLYTECHNIQUE FEDERALE DE LAUSANNE (EPFL), Lausanne (CH)

(72) Inventors: Touradj Ebrahimi, Pully (CH); Lin Yuan, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 14/815,192

(22) Filed: Jul. 31, 2015

(65) Prior Publication Data

US 2017/0034523 A1    Feb. 2, 2017

(51) Int. Cl.
*G06K 9/36*    (2006.01)
*H04N 19/67*    (2014.01)
*G06F 17/00*    (2006.01)

(52) U.S. Cl.
CPC .................................. *H04N 19/67* (2014.11)

(58) Field of Classification Search
CPC .................................. G06F 3/00; H04N 19/00
USPC ........ 382/100, 169, 232, 233, 246; 715/268, 715/210; 726/3
See application file for complete search history.

(56) References Cited

U.S. PATENT DOCUMENTS

| 5,113,251 | A | 5/1992 | Ichiyanagi et al. |
| 5,289,570 | A | 2/1994 | Suzuki |
| 6,181,836 | B1 * | 1/2001 | Delean ...................... G06T 3/00 345/428 |
| 6,973,217 | B2 | 12/2005 | Bolick et al. |
| 7,974,477 | B2 * | 7/2011 | Shi ........................ G06T 1/0035 382/100 |
| 2002/0116399 | A1 | 8/2002 | Campus |
| 2006/0170704 | A1 | 8/2006 | Kotani et al. |
| 2007/0299888 | A1 | 12/2007 | Thornton et al. |
| 2008/0260293 | A1 | 10/2008 | Ahn et al. |

(Continued)

FOREIGN PATENT DOCUMENTS

| CN | 103473796 A | 12/2013 |
| CN | 103605928 A | 2/2014 |

(Continued)

OTHER PUBLICATIONS

Shakhray, "Assisted Patent Search R&I" Mandate No. 15-30120, Jul. 30, 2015, pp. 17.
Richter, "Backwards Compatible Coding of High Dynamic Range Images with JPEG", Data Compression Conference (DCC), Mar. 20-22, 2013, pp. 153-160.

*Primary Examiner* — Abolfazl Tabatabai
(74) *Attorney, Agent, or Firm* — Maschoff Brennan

(57) ABSTRACT

The present invention concerns a method of encoding a media bitstream of a media content. The media bitstream comprises a payload portion for the media content, and an overhead portion, different from the payload portion. The method comprises the steps of: modifying a part of the payload portion of the media bitstream, the modified part representing a region of the media content; and inserting the said part, as unmodified, into the overhead portion of the modified media bitstream for later reconstruction of the unmodified payload portion, such that the modified part in the media bitstream can be decoded without decoding the part as unmodified from the overhead portion. The invention also relates to a method of decoding, to an encoder and to a decoder.

20 Claims, 6 Drawing Sheets

(56) References Cited

U.S. PATENT DOCUMENTS

| | | |
|---|---|---|
| 2012/0050574 A1 | 3/2012 | Choi |
| 2013/0011002 A1* | 1/2013 | Levy .................. G06T 1/005 382/100 |
| 2013/0254843 A1 | 9/2013 | Dagaeff et al. |
| 2013/0257898 A1 | 10/2013 | Ashcraft et al. |
| 2013/0259395 A1 | 10/2013 | Massimino |
| 2013/0329941 A1* | 12/2013 | Thorwirth .......... H04N 19/467 382/100 |
| 2014/0281945 A1 | 9/2014 | Avni et al. |
| 2015/0016735 A1 | 1/2015 | Kikuchi |

FOREIGN PATENT DOCUMENTS

| | | |
|---|---|---|
| CN | 104484614 A | 4/2015 |
| EP | 2 256 687 A1 | 12/2010 |
| GB | 2 382 509 A | 5/2003 |
| JP | H04-290119 A | 10/1992 |
| JP | H11-69256 A | 3/1999 |
| JP | 2001-243487 A | 9/2001 |
| JP | 2003-123085 A | 4/2003 |
| JP | 2004-264945 A | 9/2004 |
| JP | 2008-060891 A | 3/2008 |
| JP | 2009-225162 A | 10/2009 |
| KR | 20060057134 A | 5/2006 |
| KR | 10-2010-0081440 A | 7/2010 |
| TW | 200901742 A | 1/2009 |
| WO | 2004/066204 A1 | 8/2004 |

* cited by examiner

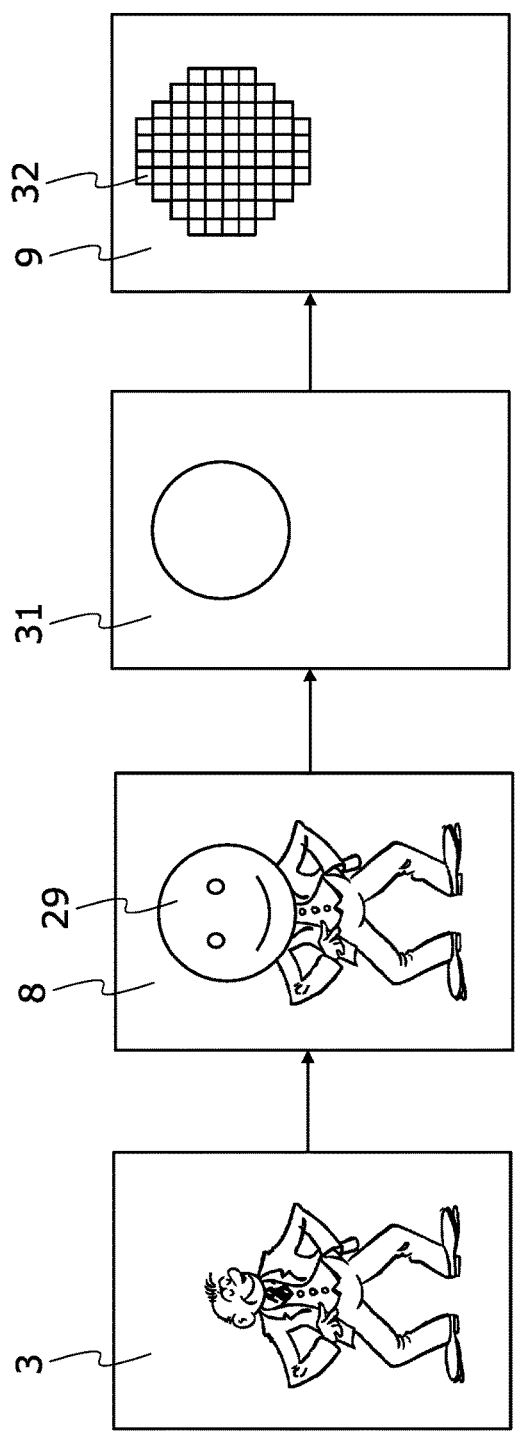
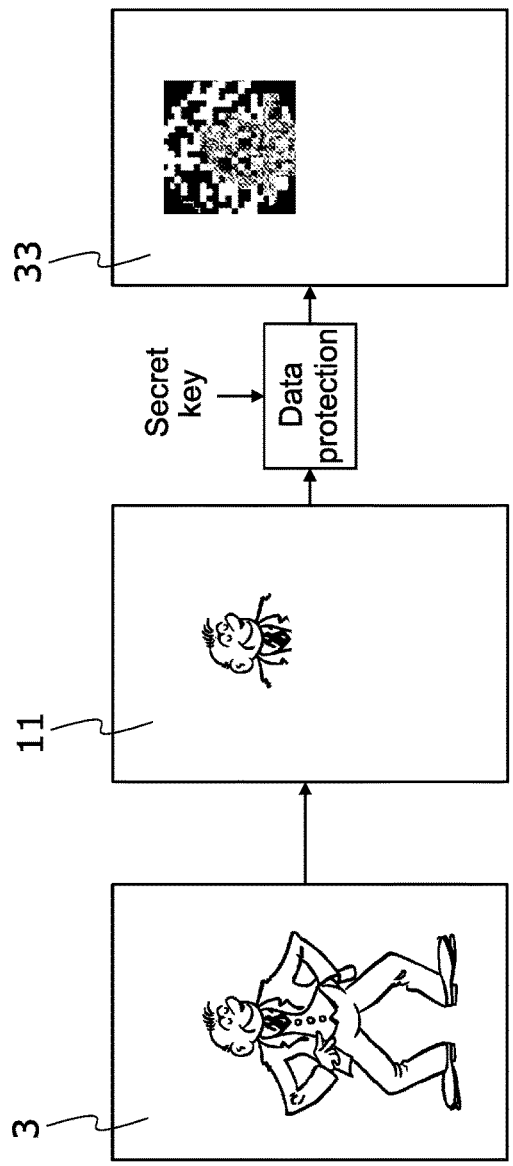

MEDIA CONTENT PROCESSING METHOD

TECHNICAL FIELD

The present invention relates to a method of media bitstream encoding. More specifically, according to the present method, an original media content element is transformed into a processed media content element while preserving sufficient information about the original media content element in the processed media content element so that the original media content can be recovered. The invention also relates to a method of decoding the media bitstream and to the corresponding encoder and decoder.

BACKGROUND OF THE INVENTION

With the popularization of high-quality digital cameras, smart mobile devices with high-resolution cameras, as well as user-friendly imaging and social networking applications, taking pictures, then editing and sharing, have become part of everyday life for many. Picture-related applications are extremely popular because pictures present attractive and vivid information. Nowadays, people record everyday life, communicate with each other and enjoy entertainment using various interesting imaging applications allowing original images to be transformed into processed images. The success of digital imaging applications is also due to the development of effective standards such as JPEG (Joint Photographic Experts Group) and JPEG 2000. JPEG is one of the early standards and is the most popular compression format to store or transmit images thanks to its efficiency and low complexity. JPEG 2000 is a more recent standard for still image coding, offering efficient image compression, progressive transmission, seamless scalability, region-of-interest coding and error resilience. However, even though JPEG 2000 outperforms JPEG in terms of compression efficiency, JPEG has remained the most popular format in a large variety of consumer imaging applications. Another popular format in addition to the above is PNG (Portable Network Graphics), which offers in addition a possibility of lossless and transparency (alpha channel) coding.

JPEG also offers a solution for tagging images. JPEG/Exif (Exchangeable image file format) is a popular way for digital cameras and other photographic capture devices to tag capture and location related metadata about photos. JPEG/JFIF (JPEG File Interchange Format) is the most popular format for storage and transmission of images on the World Wide Web. The two formats are often not distinguished from each other and are simply referred to as JPEG, each with its own application segments (APP0 for JFIF, APP1 for Exif) in the header of a JPEG file. Recently, a new standardization activity called JPEG XT has been initiated, addressing the needs of photographers for higher dynamic range (HDR) images in both lossy and lossless coding while retaining backward compatibility to the established legacy JPEG decoders. The central idea underlying the backward compatible coding of HDR content is to encode a low dynamic range version of the HDR image generated by a tone-mapping operator using a conventional JPEG encoder and to insert the extra encoded information for HDR in an application marker of a JPEG file header. Adopting this idea, any useful information can be embedded in the application markers of a JPEG file.

In many situations, a modified or processed image or media data element needs to be recovered to its original content. The typical solution is to keep both the original and the modified versions of the data element. This leads to increased bandwidth usage and storage resources. Thus, it becomes clear that this solution is not optimal, and there is a need for a more efficient solution allowing the original media content to be recovered.

It is an object of the present invention to overcome the problem related to recovering the original media content once the original media data element has been modified.

SUMMARY OF THE INVENTION

According to a first aspect of the invention, there is provided a method of encoding a media bitstream as recited in claim 1.

The proposed new solution has the advantage that, when a media data file is modified, the original file can be recovered without the need to retain the entire original file. Sufficient information about the original media file is preserved in the modified media file to allow the recovery of the content of the original media file. Thus, the proposed solution is very efficient in terms of memory usage and transmission bandwidth. Furthermore, the amount of data processing required to recover the original media content is relatively small.

According to a second aspect of the invention, there is provided a method of decoding a media bitstream as recited in claim 15.

According to a third aspect of the invention, there is provided a media bitstream encoder as recited in claim 19.

According to a fourth aspect of the invention, there is provided a media bitstream decoder as recited in claim 20.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which:

FIG. 2 is a block diagram illustrating the generation of a mask matrix according to an example of the present invention;

FIG. 3 is a block diagram illustrating the generation of a protected sub-image according to an example of the present invention;

DETAILED DESCRIPTION OF AN EMBODIMENT OF THE INVENTION

Figure 1:
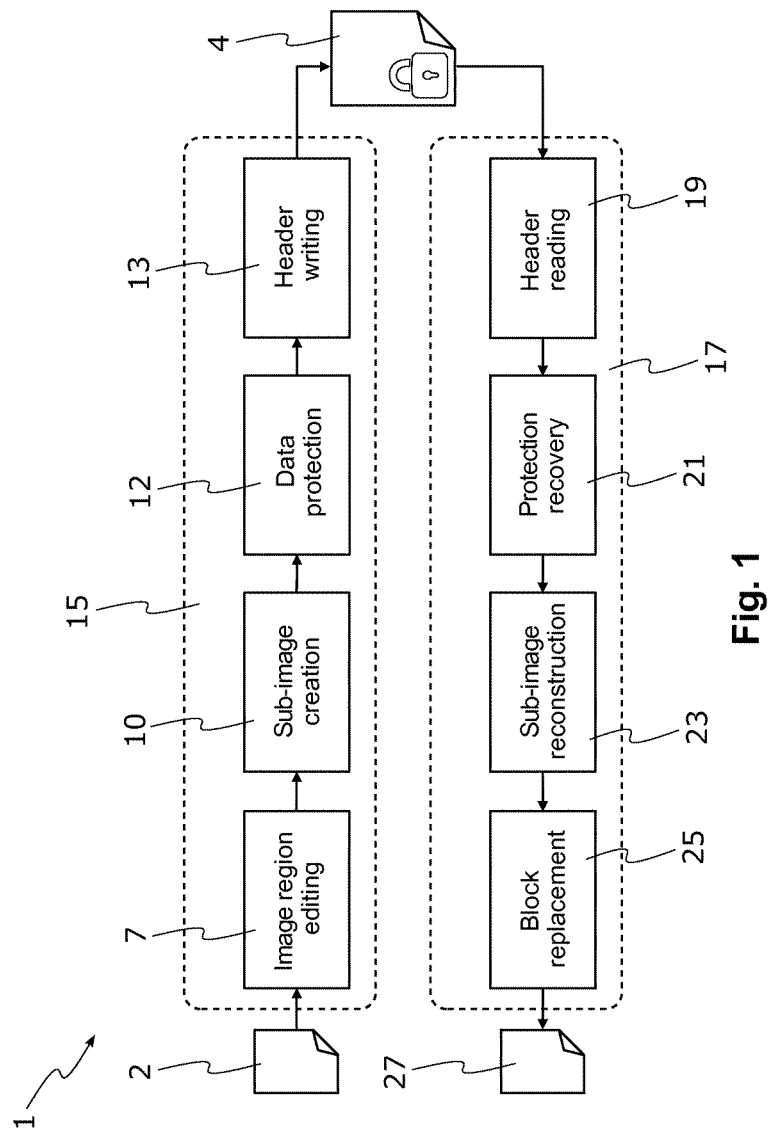
FIG. 1 is a flow chart summarizing the media bitstream encoding and decoding operations according to an example of the present invention.

An embodiment of the present invention will now be described in detail with reference to the attached figures.

This embodiment is described in the context of JPEG images, but the teachings of the invention are not limited to this environment. The teachings of the invention are equally applicable in various media stream editing systems and standards, such as PNG, JPEG 2000, MPEG, portable document format (PDF) etc. or proprietary systems. Identical or corresponding functional and structural elements which appear in the different drawings are assigned the same reference numerals.

FIG. 1 is simplified flow chart summarizing the media bitstream encoding and decoding steps according to an example of the present invention. The teachings of the present invention may be implemented in an imaging system 1 comprising an encoder 15, also referred to as a transmorphing unit, and a decoder 17, also referred to as a reconstruction unit. According to one aspect of the present invention, the described embodiment provides a media bitstream encoding method which transforms a source media bitstream 2 of a media content, also referred to as an original media bitstream or a first data element, to another media bitstream 4, also referred to as a processed media bitstream or a second data element, while preserving sufficient information about the source media bitstream in the processed media bitstream so that the source media bitstream or its content can be later recovered. Furthermore, to later recover the content of the source media bitstream, there is no need to save the bitstream of the source image. In the present text, this kind of process is called a transmorphing process. The source media bitstream 2 or the processed media bitstream 4 may represent any media content, such as an image or graphics content, an audio content or a video content. The source media bitstream 2 and the processed media bitstream 4 may or may not represent the same data element type. In other words, the source media bitstream 2 and the processed media bitstream 4 may or may not be of the same file format. In the described example, the source media bitstream 2 and the processed media bitstream 4 both represent JPEG image files. By the term "JPEG image" is understood an image that complies with standards promulgated by Joint Photographic Experts Group as ISO/IEC (International Organization for Standardization/International Electrotechnical Commission) 10918-1 or ITU-T (International Telecommunication Union-Standardization) T.81, namely that it can be decoded by any implementation of a JPEG compliant decoder.

Next the steps illustrated in FIG. 1 are briefly explained, but these steps are explained later more in detail. As can be seen in FIG. 1, in step 7 a modified image 8 (FIG. 2) is generated from the source image 3. This can be done by simply editing a region or multiple regions of the source image 3. In this example one region representing a sub-content of the image content is edited. The region could however represent the whole image content instead. To create the modified image 8, a user can operate any image processing or editing tool on (a) selected region(s) of the source image 3. In the present invention, when modifying the media content, it is actually the bitstream representing the media content which is modified. Step 7 may also include generation of a so called mask matrix 9 (FIG. 2) indicating the location, shape and/or size of the modified region in the source image. This can be generated automatically by the imaging application if it knows the location, shape and size of the modified region. However, if the imaging application is not aware of the exact modified region beforehand, then the mask matrix 9 is generated based on the differences between the source image 3 and the modified image 8. In step 10 a sub-image 11 (FIG. 3) of the source image 3 is generated. The sub-image comprises the content of the source image in the region(s) which is/are modified. Optionally in step 12, some of the imaging data, such as the sub-image data, are protected by data encryption and/or scrambling, for example. In step 13 this imaging data is written in a header or overhead portion of the modified image file. More specifically, the imaging data, including the data representing the sub-image, is inserted in at least one application segment identified by an APPn marker of the resulted processed JPEG image bitstream, along with metadata about the location, shape and/or size and protection information about the sub-image 11. In this way, the processed JPEG image is created. The steps 7, 10, 12 and 13 mentioned above may all be performed by the encoder 15. The encoder may comprise software and/or hardware sub-units, such as an image editor, sub-image creator etc., arranged to perform some of the above steps.

The decoder 17 is arranged to recover the content of the source image 3. In step 19 at least some of the imaging data are read from the header or overhead portion. Optionally in step 21 at least some of the imaging data, such as the sub-image, are decrypted and/or descrambled. This step is only necessary if the imaging data were earlier protected. In step 23 the content of the sub-image is reconstructed. In step 25 discrete cosine transform (DCT) coefficients of the processed image corresponding to the modified region(s) are replaced by the DCT coefficients of the sub-image 11. In this manner, a reconstructed data element 27, in this example a reconstructed image, is obtained. The steps 19, 21, 23 and 25 mentioned above may all be carried out by the decoder 17. The decoder may comprise software and/or hardware sub-units, such as a header reading unit, decryption unit, rendering unit etc., arranged to perform some of the above steps. It is to be noted that, if the teachings of the invention are applied to another image format, as well as audio or video files, the principles explained above still apply, but the detailed process becomes slightly different. For example, instead of generating a sub-image 11, a sub-audio element would be generated etc.

The encoding process begins by editing the source image 3 and by generating the mask matrix 9. These operations are explained next in more detail with reference to FIG. 2. The image editing is done by processing the source image 3 in a selected image region or regions. In the example illustrated in FIG. 2, a user masks the face in the source image 3, which is a photo, by using an emoticon 29, such as a smiley face. Only one region is modified in this example. A user can select the region either manually or automatically by relying on face detection, for example. The modified image region can have an arbitrary shape, based on image pixels. If the imaging application is not aware of the exact modified image region beforehand, but only has the source and modified images, the difference between the two images is first calculated and the modified region(s) is (are) extracted. This can be achieved by for instance checking the positions where the pixel differences are greater than a certain threshold value. Based on the modified region(s), a binary image 31 is generated, the size of which in terms of number of pixels is the same as the source image 3. The elements in the binary image 31 indicate the locations of modified pixels of the source image 3. The binary image 31, or more specifically the region of the binary image corresponding to the modified region of the source image, is then dilated, to match 8×8 (or any multiples of 8) minimum coded unit (MCU) block boundaries, and then sub-sampled at a factor of 8 in both horizontal and vertical directions to obtain the binary mask matrix 9. An MCU block is a pixel block or tile of a JPEG image. In this case each MCU block 32 has a size of 8×8 pixels. The sub-sampling is preferably done such that only one bit can indicate the value of one entire block. Thus, the values of eight blocks can be fitted into one byte. In the mask matrix, each element or MCU block points to a corresponding MCU block of the source image 3. In this example, element values of 1 in the mask matrix 9 denote MCU blocks where the source image is modified, corresponding to modified blocks.

FIG. 3 illustrates the generation of the sub-image 11 and a protected sub-image 33. The sub-image 11 is generated from the source image 3 for the region indicated by the mask matrix, i.e. corresponding to those blocks of the mask matrix 9 which have the value equal to 1. Thus, according to the mask matrix 9, a sub-image 11 of the source image 3 corresponding to the modified region of the source image is created and possibly protected as explained below in more detail. According to this example, to create the sub-image 11, only the modified MCU blocks of the source image are encoded or transcoded to JPEG, while all or substantially all the DCT coefficients of the unmodified blocks are set to zero. Therefore, the sub-image 11 contains the complete information about the modified region of the source image 3. This means that, if the sub-image 11 is preserved in the file of the modified image 8, the source image 3 or its content can be reconstructed from the file of the modified image 3. In this example the sub-image 11 has the same size as the source image 3. However, the size of the sub-image 11 could instead be different from the source image 3. According to this example, only the visual information of the modified regions is visible in the sub-image 11, while the remaining parts of the sub-image 11 are represented by a single color, such as gray. As the DCT coefficients of the unmodified blocks are all zero, the JPEG sub-image has much smaller file size compared to the source image 3 after entropy coding. Advantageously, the modified regions can have any size and/or shape. The modified regions can be a rectangle, for instance, or they can have any arbitrary shape, or they can be several disconnected regions. Advantageously, no information of unmodified blocks is used during the reconstruction process. In other words, no information of the unmodified blocks needs to be inserted into the header. To make the encoding even more efficient, it would be possible to insert only the entropy coded data of the modified regions into the application segment(s).

It is to be noted that every JPEG image is actually stored as a series of compressed image tiles that are usually only 8×8 pixels in size, which is the minimum size. These tiles are generally called MCU blocks whose size can also be 16×16 or 16×8 instead of 8×8, depending on the chroma subsampling. A DCT block, on the other hand, is always 8×8 in size. When referring to a DCT block, this means an 8×8 block of one color channel, based on which the DCT transformation is conducted. Thus, a DCT block of a JPEG image contains 64 DCT coefficients. When referring to an 8×8 MCU block, it is actually an ensemble of three DCT blocks for three color channels, e.g., YUV. Thus a DCT block can be considered as the minimal image unit that an MCU block can contain, and an MCU block may contain several DCT blocks. According to the present invention, when an image region is replaced, then the DCT coefficients are actually replaced within the region or the MCU block.

In many practical applications, the sub-image needs 11 to be protected for data security and/or privacy purposes, for instance to ensure a secure conditional access for privacy protection. Therefore, the present method may incorporate data protection options to protect the created sub-image 11. To do so, a user can apply image protection tools to the imaging data, including the sub-image 11, for example by using a secret key. For this purpose, a variety of media security tools can be considered, such as image encryption and/or scrambling. For example, FIG. 3 shows a protected sub-image 33 which has been JPEG scrambled. As an example, a symmetric secret key can be employed to enable the secure protection and recovery of the protected data.

Figure 4:
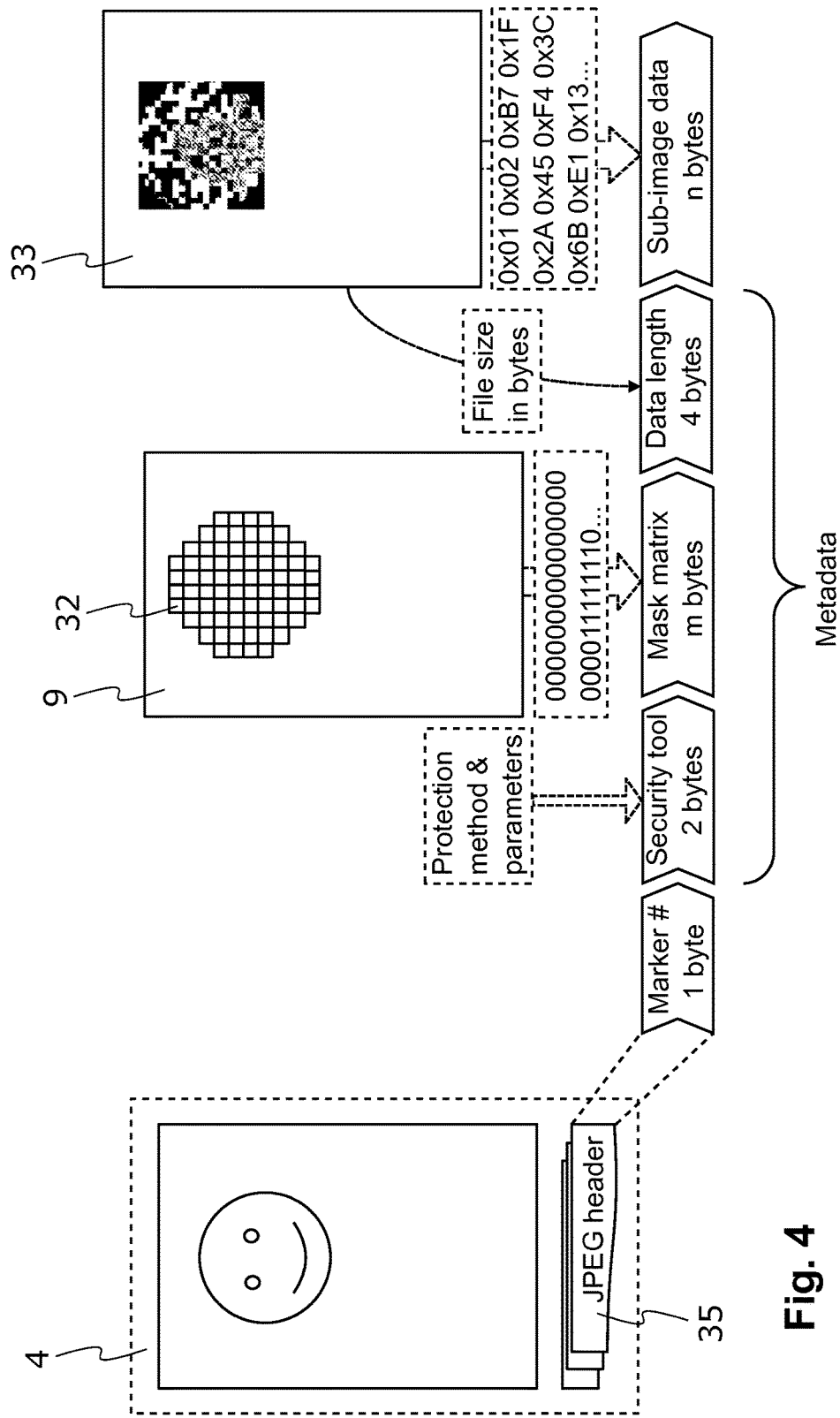
FIG. 4 is a block diagram showing how image-related data are inserted into a file header according to an example of the present invention.

FIG. 4 illustrates how the imaging data can be written into the header 35 of the processed image bitstream 4, also referred to as a processed image file 4. The processed image file 4 comprises the header, and a media content payload portion where the modified image data is saved. In this example the modified image file is a JPEG file. The header part of a JPEG file is divided into segments, and each segment starts with a marker identifying the segment. In this example, the data as explained below comprises the bitstream of the protected sub-image 33 and some metadata. The data are saved in an application segment identified by an APPn marker of the modified image file 4. The following types of application segments are available: APP0, APP1, . . . , APP15 (APPlication). In this example the metadata contains the following information: (i) security features, which comprise the security tools and/or parameters used to protect the modified region of the source image 3; (ii) the mask matrix 9, which identifies the location, shape and/or size of the modified region; (iii) the file size of the protected sub-image in bytes. In practical terms, the bitstream of the modified image region and the bitstream of the metadata may be inserted into the header of the modified image bitstream. In this way a bitstream of the processed image is obtained. According to this example, the metadata and the protected sub-image data are inserted in the JPEG header in the following order and formats:

Marker ID (1 byte): APP11 marker is used in this example.

Security features (2 bytes): 1 byte signals the security method, e.g., 0×01 is referred to as JPEG scrambling (illustrated in FIG. 4), while 0×02 as advanced encryption standard (AES). The second byte signals the security parameters, e.g., strength of scrambling and key length of the AES.

Mask matrix (m bytes): m bytes signal the mask matrix 9. As the mask matrix 9 is binary valued, and the pixels within an MCU block have the same value, each MCU block can be represented with one bit only, and these bits are written in the m bytes of data. Here, $$m = \operatorname{ceil}\left(\frac{MCU_w \times MCU_h}{8}\right),$$

where $MCU_w \times MCU_h$ is the size of the mask matrix.

Sub-image data size (4 bytes): here the length in bytes of the inserted sub-image data, in this example the size of the protected sub-image data, is given. This is to make sure that the reconstruction process can easily and correctly read the n bytes of the sub-image data from the APPn markers. It is to be noted that the inserted data can extend over more than one APPn marker in the header, as explained later.

Sub-image data (n bytes): the data of the sub-image, where n is the data size in bytes, are inserted here. In this example, it is the protected sub-image data which are inserted. As the length of each application segment in JPEG is limited to 65536 bytes, the sub-image data may be written separately over multiple APPn segments if the sub-image is too large.

Once the data above are inserted in the header, the processed image bitstream 4 has been generated. The above inserted imaging data can be used for reconstructing the modified region of the source image 3. The reconstruction process is explained next.

The reconstruction process aims to recover the source image 3 or its content from the processed image. This can be done by reversing the encoding process described above. In other words, the data from the application segments are recovered, the sub-image 11 is reconstructed and the DCT coefficients or the entropy coded DCT coefficients corresponding to the modified MCU blocks of the processed image are replaced with those of the sub-image 11. If the sub-image 11 is protected as illustrated in FIGS. 4 and 5, a secret key is provided to decrypt and/or descramble the extracted protected sub-image 33 and to recover the sub-image 11.

Figure 5:
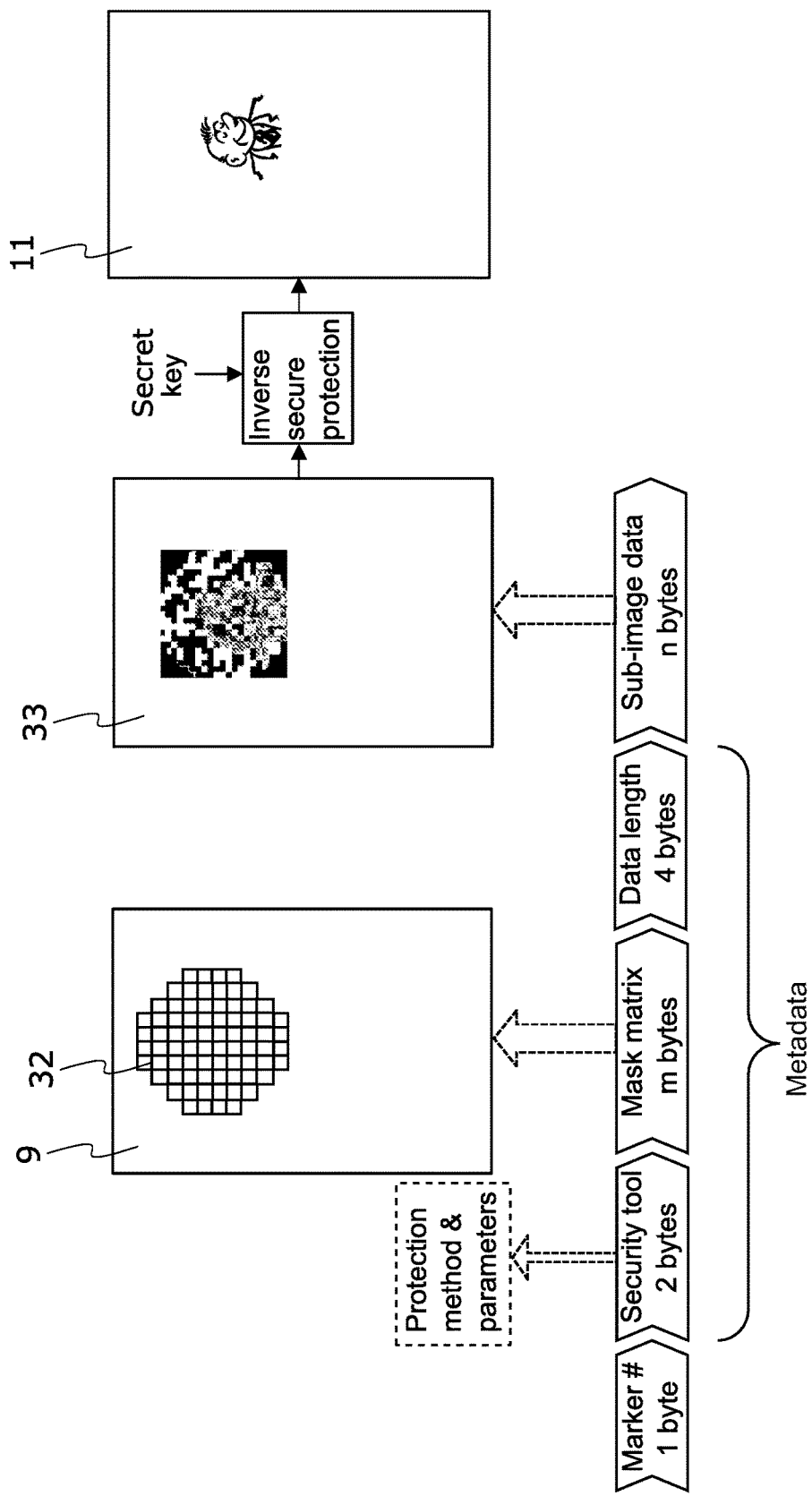
FIG. 5 is a block diagram showing how image-related data are read from the file header according to an example of the present invention.

With reference to FIG. 5, the reconstruction process starts with the decoder 17 reading the header of the processed image bitstream 4. More specifically, the data in the application segments identified by the APPn markers are read. The inserted metadata, as well as the sub-image data, are extracted from the application segments. After the marker ID, information about data protection is extracted from the 2 bytes of data so that the reconstruction process knows exactly what security features were applied to the sub-image 11, if any, and how. By reading the bits consequently in the m bytes of data which indicate the mask matrix, it is possible to re-build the mask matrix 9. Finally, by knowing the file size (in bytes) of the sub-image or the protected sub-image in this example, the decoder 17 can find the next n bytes to reconstruct the inserted sub-image 11, or in this example the protected sub-image 33. If the sub-image was protected, a decryption and/or descrambling process is applied to the protected sub-image 33 with the correct secret key as shown in FIG. 5 to obtain the sub-image 11.

Figure 6:
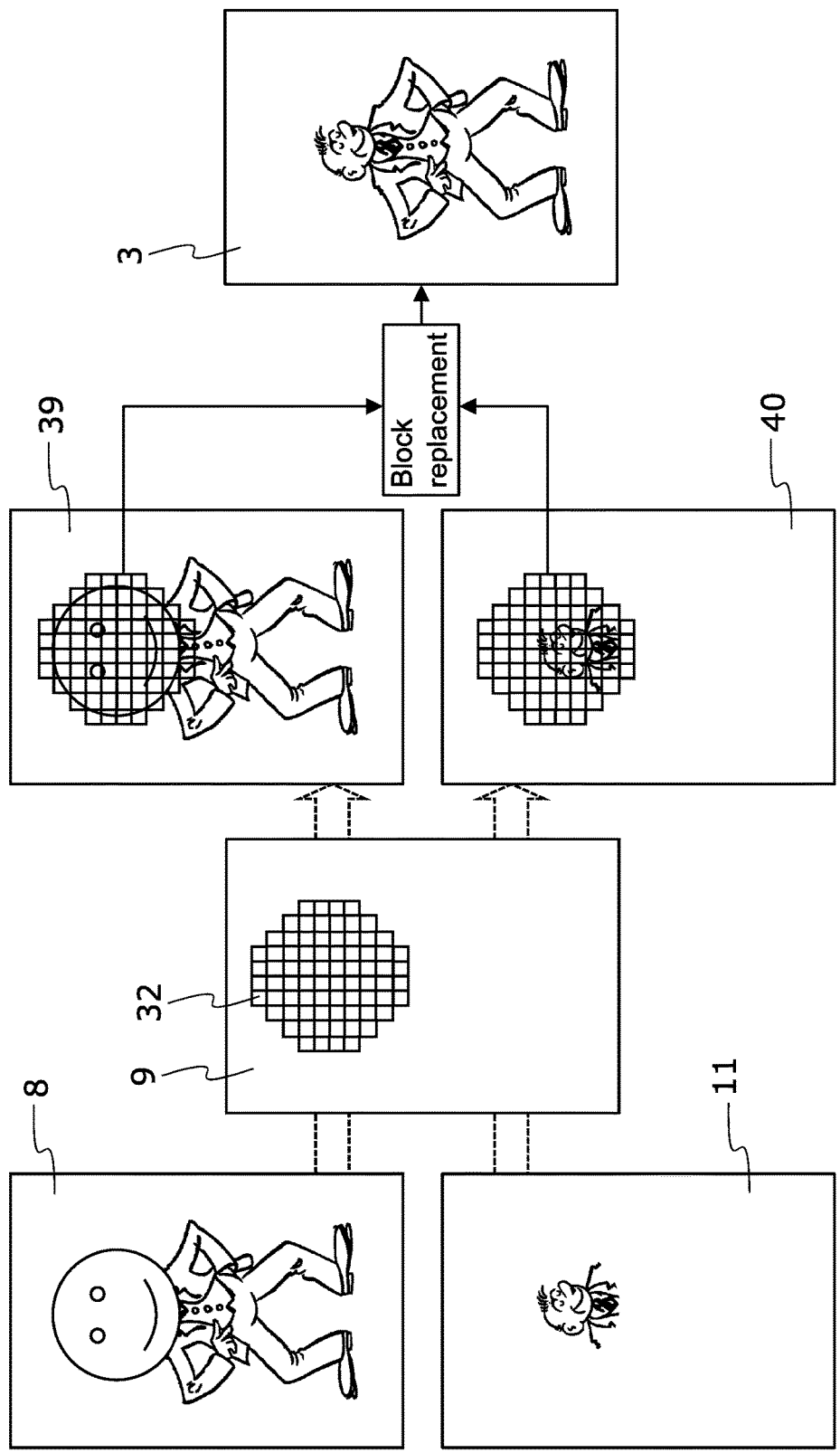
FIG. 6 is a block diagram showing how the content of the original image can be recovered by replacing the content of a modified region in a modified image with the sub-image according to an example of the present invention.

Then, as shown in FIG. 6, with the extracted mask matrix 9 identifying the positions of the modified blocks, the DCT coefficients corresponding to the modified region(s) in the processed image are replaced by those of the sub-image 11 in the decoder 17. In the process, as can be seen in FIG. 6, the mask matrix 9 may be overlaid on the modified image 8 to obtain an overlaid modified image 39. In a similar manner, the mask matrix 9 may be overlaid on the sub-image 11 to obtain an overlaid sub-image 40. In this way it is easy to do the DCT block replacement of the overlaid sub-image 40 in the overlaid modified image 39, and the source image content can be recovered.

An example was described above, in which one region was masked, and then the masked region was subsequently reconstructed by the decoder 17. The modified region may even be of the same size as the source image 3. In this case the source image 3 and the modified image 8 may be completely different images. As was explained, sufficient information of a previous version of the media is embedded in the bitstream of the new version of the media to reconstruct the previous version. The new version thus remains fully decodable by any conventional decoder for that media, but an extended decoder can also produce the previous version after some processing, as explained above. In practice, the APPn markers act as a skip mechanism, allowing a legacy decoder to skip a given number of bits without decoding them.

Figure 7:
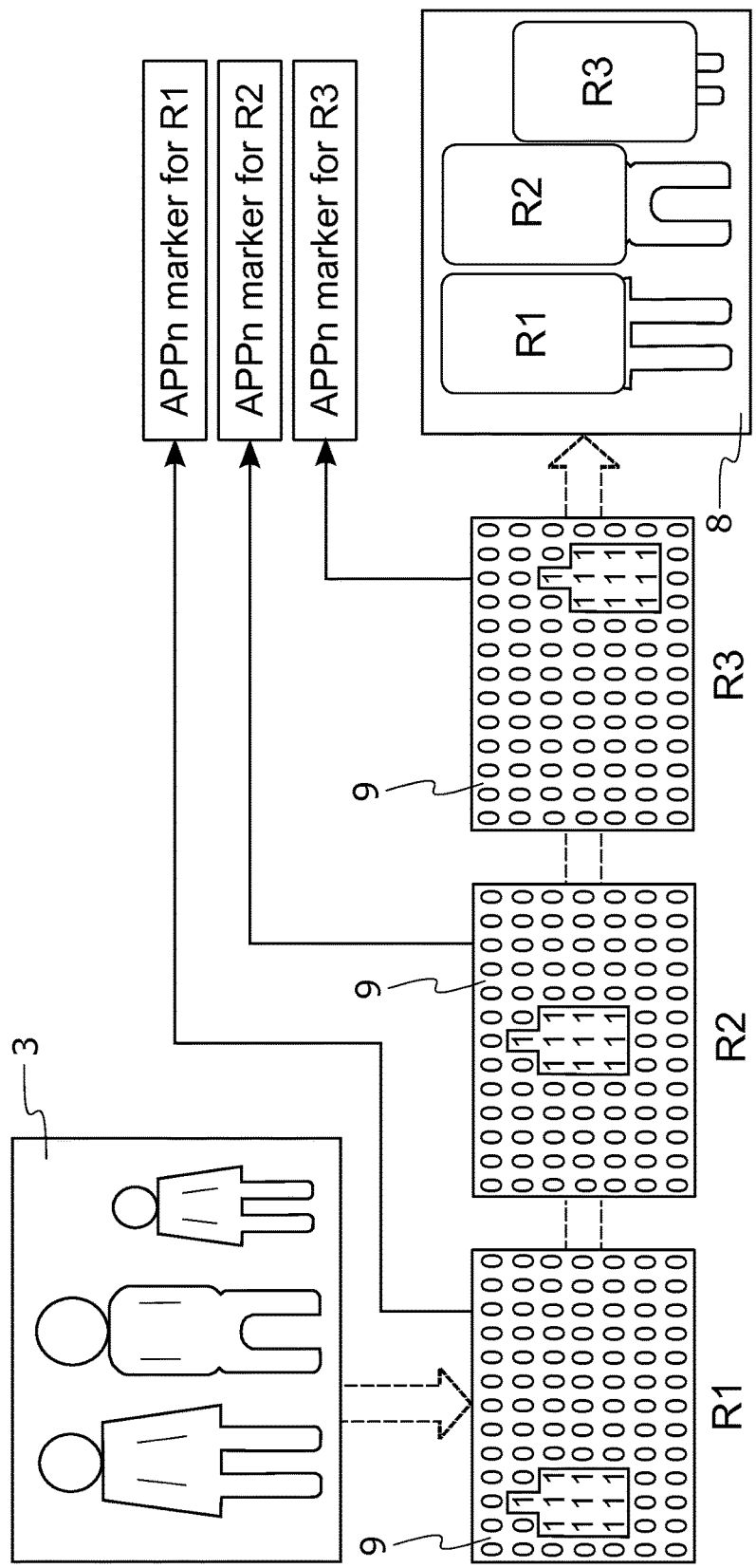
FIG. 7 is a block diagram showing how multiple regions of the original image can be modified according to an example of the present invention.

The proposed method also allows for multi-region operation. In other words, as illustrated in FIG. 7, the user can modify more than one image or media region using the present method. In FIG. 7 there are shown three regions R1, R2 and R3. Each processed media region is assigned an ID, and the imaging data of each region is inserted in the APPn segments in an order based on the ID, for example. In this way, imaging data about one region is in one APPn segment, while imaging data about another region is in another APPn segment. The region IDs merely indicate the order in which the regions are modified and inserted into the file of the processed image. The region ID is different from the Marker ID (#) (FIGS. 4 and 5). The marker ID is a number indicating the function of the marker. For example, in the implementation explained above, APP11 means that this data field contains the sub-image data. On the other hand, APP1 may be used for Exif information. Even when multiple regions are inserted, each of the inserted markers will still be marked as APP11. Because the markers for each region are inserted according to an order, the decoder also reads these markers according to that order. So the decoder implicitly knows the order or the ID of the APP11 marker it reads. This is why the region ID does not need to be explicitly included in the file. The user can then selectively reconstruct an image or media region by providing an implicit region ID. Implicit region ID here refers to an ID that it is not written in the bitstream, as opposed to an explicit region ID. In a similar manner, it is possible to reconstruct multiple prior versions of an image or media. By following the analogy above, each version may be considered as a separate modified region.

The teachings of the present invention may be applied for instance in various social network or gaming applications. Social networks on the Internet have become increasingly popular. Users like to share photos, for example, with other members of their social network. However, data privacy is an issue which often requires careful consideration. Files shared with friends or with a closed group of people on the social network can under certain circumstances be read by third parties. Third parties may use this information for targeted advertising, for example. By using the teachings of the present invention, it is possible to share files with a closed group of people without the danger of third parties being able to see the original content in the masked regions after opening the file. In this example, the closed group of people could see the unmasked regions as long as they have access to the secret key as explained above. So the owner of the source file can selectively grant access to the source file. Thus, it is possible for the users to hide a part of a media content of the file, such as a given individual's face, and to allow only selected users to see it.

Insertion of additional information into a file increases the overhead of the file and therefore the file size. However, as the sub-image 11 represents only a part of the visual information of the source image 3 and is coded in JPEG in the above example, the data size of the sub-image 11 is usually much smaller than that of the source image. Besides, as the metadata inserted in the file header occupies only a few bytes, it is negligible when compared to the inserted sub-image 11. Therefore, the additional overhead to the processed image mainly depends on the number and sizes of modified regions.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding a media bitstream of a media content, the media bitstream comprising a payload portion for the media content and an overhead portion, different from the payload portion, the method comprising:
   modifying a part of the payload portion of the media bitstream, the modified part representing a region of the media content;
   determining a size, a shape and/or a location of the region for obtaining the said part, as unmodified; and
   inserting the said part, as unmodified, into the overhead portion of the modified media bitstream for later reconstruction of the unmodified payload portion, such that the modified part in the media bitstream can be decoded without decoding the part as unmodified from the overhead portion.

2. The method according to claim 1, further comprising applying data protection and/or compression to the part as unmodified.

3. The method according to claim 2, wherein the method further comprises inserting a third data set representing information about the data protection into the modified media bitstream.

4. The method according to claim 2, wherein the data protection comprises data encryption and/or scrambling.

5. The method according to claim 1, wherein the modified part represents a sub-region of the media content.

6. The method according to claim 1, wherein the method further comprises:
   determining the size of the part as unmodified; and
   inserting a first data set representing the indication of the size of the part as unmodified into the modified media bitstream.

7. The method according to claim 1, wherein the determining further comprises:
   generating a mask matrix indicating the size, shape and/or location of the region; and
   inserting a second data set representing the mask matrix into the modified media bitstream.

8. The method according to claim 7, wherein the mask matrix is a binary data element.

9. The method according to claim 7, wherein the method further comprises determining a difference between the payload portion of the media bitstream and the payload portion of the modified media bitstream for obtaining the mask matrix.

10. The method according to claim 7, wherein the method further comprises:
    generating an intermediate binary matrix indicating with a given bit value the size, shape and/or location of the modified region; and
    dilating the intermediate binary matrix to match block boundaries of minimum coded units to obtain the mask matrix.

11. The method according to claim 1, wherein the method further comprises modifying at least a second part of the payload portion of the media bitstream, the modified second part representing another region of the media content.

12. The method according to claim 1, wherein the media bitstream is one of the following: image bitstream, audio bitstream and video bitstream.

13. The method according to claim 1, wherein the media bitstream is a JPEG bitstream or a PNG bitstream.

14. The method according to claim 13, wherein the media bitstream is the JPEG bitstream, and wherein the part as unmodified is inserted into an application segment identified by an APPn marker of the overhead portion of the modified JPEG media bitstream.

15. A method of decoding a media bitstream encoded according to the method of claim 1, the method comprising replacing said modified part in the payload portion of the modified media bitstream with said part as unmodified from the overhead portion of the modified media bitstream.

16. The method according to claim 15, wherein the replacement is dependent on a secret key.

17. The method according to claim 15, wherein the method further comprises:
    reading mask matrix data from said modified media bitstream, the mask matrix data representing information about the size, shape and/or location of the region; and
    using the mask matrix data for the replacement to indicate the location and number of bits in the modified media bitstream that are to be replaced.

18. The method according to claim 15, wherein the replacing unmodified part comprises replacing discrete cosine transform coefficients of the region of the media content.

19. An encoder for encoding a media bitstream of a media content, the media bitstream comprising a payload portion for the media content and an overhead portion, different from the payload portion, the encoder being configured to perform operations comprising:
    modify a part of the payload portion of the media bitstream, the modified part representing a region of the media content;
    determine a size, a shape and/or a location of the region for obtaining the said part, as unmodified; and
    insert the said part, as unmodified, into the overhead portion of the modified media bitstream for later reconstruction of the unmodified payload portion, such that the modified part in the media bitstream can be decoded without decoding the part as unmodified from the overhead portion.

20. A decoder for decoding a media bitstream encoded according to the encoder of claim 19, the decoder being configured to perform operations comprising:
    replace said modified part in the payload portion of the modified media bitstream with said part as unmodified from the overhead portion of the modified media bitstream.

* * * * *